United States Patent [19]

Dake et al.

[11] Patent Number: 5,073,394
[45] Date of Patent: Dec. 17, 1991

[54] POULTRY STOCK FROM MECHANICALLY DEBONED MEAT

[75] Inventors: Roger L. Dake, Fayetteville; Jerry E. Webb, Farmington; Richard H. Forsythe, Fayetteville; Rodney E. Wolfe, Springdale, all of Ark.

[73] Assignee: Campbell Soup Company, Camden, N.J.

[21] Appl. No.: 580,545

[22] Filed: Sep. 11, 1990

[51] Int. Cl.⁵ .................................................. A23L 1/00
[52] U.S. Cl. ....................................... 426/509; 99/406; 99/407; 426/523
[58] Field of Search ............... 426/523, 589, 509, 495; 99/353, 355, 406, 407

[56] References Cited

U.S. PATENT DOCUMENTS

| | | | |
|---|---|---|---|
| Re. 32,060 | 12/1985 | McFarland | 426/518 |
| 3,028,243 | 4/1962 | Robertson et al. | 426/480 |
| 3,615,584 | 10/1971 | Schlamb et al. | 426/646 |
| 3,615,693 | 10/1971 | Billerbeck | 426/513 |
| 3,797,376 | 3/1974 | Meyer et al. | 99/353 |
| 3,857,989 | 12/1974 | King | 426/518 |
| 3,873,750 | 3/1975 | Torr | 426/518 |
| 4,084,492 | 4/1978 | Sullivan | 99/407 |
| 4,315,950 | 2/1982 | Reed | 426/509 |
| 4,547,383 | 10/1985 | Goldhahn | 426/511 |
| 4,798,132 | 1/1989 | Chan | 99/331 |

Primary Examiner—George Yeung
Attorney, Agent, or Firm—Banner, Birch, McKie & Beckett

[57] ABSTRACT

The invention relates to a method and associated apparatus for production of broth or stock from mechanically deboned meat. The mechanically deboned meat is extruded into a circulating stream of hot water or recycled broth in a closed sanitary tubing system sized to provide the required degree of cooking. The deboned meat introduced into the extruder may be mixed with salt and/or sodium phosphate to promote protein extraction and binding ("cohesion"). The broth and cooked meat are separated and further processed or stored for later use. The separated extruded meat may be further cooked by conventional methods, e.g., in open kettles, to produce additional broth and fat, or used as an ingredient in numerous meat products. The separated broth may be recycled to increase the amount of solubilized protein therein or diverted for immediate use elsewhere.

36 Claims, 3 Drawing Sheets

POULTRY STOCK FROM MECHANICALLY DEBONED MEAT

TECHNICAL FIELD

This invention relates to a method and associated apparatus for the continuous production of meat broth or stock from mechanically deboned meat.

BACKGROUND OF THE INVENTION

There are numerous prior art processes for the preparation of meat products from carcasses and tailings considered by-products. The prior art is relatively silent on the other hand in regard to processes for the preparation of broth from such products.

U.S. Pat. No. 3,615,693 to Billerbeck et al. discloses a process for converting naturally occurring raw, untrimmed meat containing connective tissue, muscle fiber, gristle, cartilage, bone fragments, and collagen into an easily digestible, ready-to-eat meat product. The thrust of this patent is directed to the production of a cooked meat product by extruding raw emulsified meat directly below the surface of a hot aqueous solution in a kettle, which is maintained at a temperature of about 50° F. higher than the temperature required to coagulate the raw meat. Extrusion of the meat directly below the surface of the hot aqueous solution provides greater control of coagulation of the meat product. However, there is no disclosure or suggestion with respect to any of the hot aqueous solution used to cook the meat product.

Additionally, various processes of are known for the preparation of animal food products. For example, U.S. Pat. No. Re. 32,060, teaches the deboning of meat products using an extrusion machine. U.S. Pat. No. 3,857,989 discloses the extrusion of animal flesh and bone under high pressure by utilizing a press which forces the meat products and bones through a series of orificed plates. The product comprises a semi-liquified mass having a homogeneous consistency—the bones being indistinguishable therein. U.S. Pat. No. 3,028,243 discloses a slurry process to remove bone from meat products to produce a bone-free meat product. However, no continuous process for the preparation of broth which is easily separated from the cooked meat particles from finely ground low cost meat ingredients has been described.

Thus, there exists a need for a simple, economical, relatively quick process and associated apparatus for the preparation of broth or stock from such by-products.

SUMMARY OF THE INVENTION

Accordingly, an object of this invention is to provide a method of further processing finely chopped or ground meat which produces both good quality broth and usable pieces of cooked meat.

Another object of this invention is to provide a simple apparatus which combines readily available food processing equipment in an economical fashion to produce the desired products.

A further object of this invention is to provide a process which substantially shortens cooking time.

In accordance with these objectives, this invention relates to a method and associated apparatus for production of meat broth or stock from mechanically deboned meat. The method for producing broth or stock from raw meat products comprise extruding said meat into a continuously circulating hot cooking medium and cooking said meat in said cooking medium to produce said broth or stock and cooked meat.

The apparatus for producing broth or stock from raw meat products, said apparatus comprises:

(a) an extrusion head, said extrusion head having an input and discharge portions;
(b) containment means for a cooking medium, said containment means connected to the discharge portion of said extrusion head;
(c) means for circulating said cooking medium through said containment means,
(d) means for forcing a source of meat through said extrusion head into said tubing, and
(e) a filtering device for separating said extruded meat from said cooking medium, wherein said tubing provides sufficient residence time of said extruded meat in said cooking medium following the connection of extrusion head to said tubing so as to cook said extruded meat contained therein and to allow said to extract soluble protein from said extruded meat.

More specifically, carcasses and tailings, considered by-products, are mechanically deboned and the resulting meat is forced by a pump through an extruding orifice, preferably a plurality of orifices. The extruded meat forms "ropes" of meat which are fed into a circulating stream of hot water or recycled broth in a closed sanitary tubing system of desired size and length to provide the desired degree of cooking. A Y-connection couples the extruder outlet to the sanitary tubing system. The broth and the cooked meat ropes exit the tubing system onto a screening conveyor to separate the cooked meat and the broth fraction. The screening conveyor is of a fine mesh material to minimize the content of non-solubilized meat particles in the broth. The cooked ropes are then collected and may then be further cooked by conventional methods, e.g. in open kettles, for producing additional broth and fat or further processed for use as an ingredient in numerous finished products. The separated broth, as noted above, may be recycled to increase the amount of solubilized protein therein or diverted for immediate use in packaging or further processing. The deboned meat introduced into the extruder may be mixed with salt and/or sodium phosphate to promote protein extraction and binding ("cohesion") of the mix and produced ropes.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described preferred embodiments of the invention.

DETAILED DESCRIPTION

Figure 1:
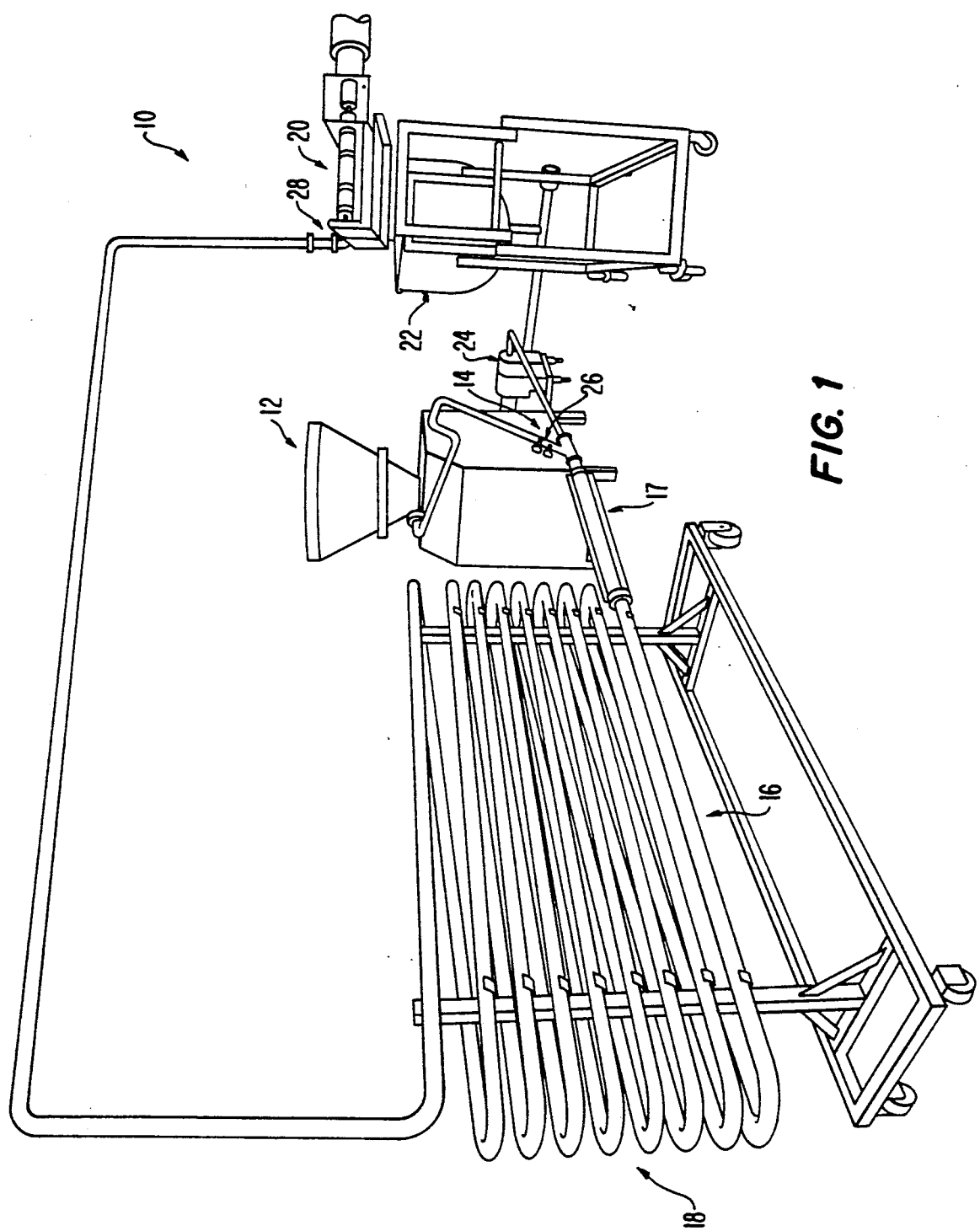
FIG. 1 is a pictorial representation of an apparatus for the continuous production of meat broth or stock from mechanically deboned meat according to the present invention.

As used throughout the specification and claims, the word "meat" includes but is not limited to beef, veal, lamb, pork, ham, poultry, and the like; and "poultry" means any fowl, whether domestic or hunted as game, such as, but not limited to, chicken, turkey, duck, goose, guinea hen, quail, and the like. Accepted meaty ingredients include those normally produced by known meat processing operations, such as (1) wholesome fines or trimmings, (2) mechanically deboned poultry from necks, backs, breast cases, or other approved pieces, and (3) ground, diced, or finely chopped meat. Further, "cooked" means any degree, including "partially done" and "ready-to-eat" (internal temperature of 160° F., Meat and Poultry Inspection Manual, Meat and Poultry Inspection Program, United States Department of Agriculture, September 1973, Part 18, pg. (151-152).

Meaty ingredients are usually processed raw, but cooked portions may be mixed in with raw portions prior to extrusion. Optional mixing to extract muscle protein to enhance binding (cohesion) of the meat can be done in any number of commonly available mixers. Time of mixing can vary with the binding tendency of the meat and mixer intensity, but typically about 5 to about 10 minutes is acceptable. Salt and/or sodium phosphates may be added to promote protein extraction and binding (cohesion) of the mix. Mixing and addition of salt or phosphate are used at the discretion of the operator, primarily when the meaty ingredient is low in protein or high in fat (thus, tending not to bind as well as high protein low fat meaty ingredients). Mixed or unmixed fresh, chilled or tempered meat is added to a food pump or extruder that is capable of pumping the viscous, tacky, cohesive mass through a tube to and through small openings (orifices) into the hot cooking medium.

In a preferred embodiment of this invention, the outlet of the extrusion head is immersed in the hot cooking medium, such that the meat is extruded directly into the hot cooking medium. In this manner, the meat begins to immediately coagulate into ropes, which are readily separable from the simultaneously formed broth. In a further preferred embodiment of the invention the meat is extruded directly into a tube of circulating hot cooking medium, e.g. hot water or broth. The tube is sized to the desired output, with the length and flow rate sized to define the cook time in the system. In a further preferred embodiment of the invention, the resulting hot broth and cooked meat rope mixture exit the tubing onto a filtering apparatus, such as a wire mesh conveyor, which separates the cooked meat from the broth. The broth, is collected for storage, further processing, or recirculation to the extrusion head and is of good quality.

A heating kettle may be used to heat the cooking medium, such as water and/or recirculated broth, prior to circulation of the water or broth to the extrusion head. In addition to or in place of the heating kettle, the tubing may be heated directly, either by jacketing or other external heating methods, or heating can be accomplished by injecting culinary steam directly into the circulating hot cooking medium at strategic points along the tubing's length. For optimum protein extraction the cooking medium should be maintained as hot as possible, preferably between about 180° F. and the cooking medium's boiling point. It will be obvious to those skilled in the art that even greater cooking medium temperatures can be obtained if the system is operated under pressure.

Referring now to the drawings in which like numerals denote similar elements, and more particularly to FIG. 1, there is shown by way of illustration, but not of limitation, an apparatus 10 for the continuous production of meat broth or stock from a meat source, preferably mechanically deboned meat. The apparatus 10 comprises a combination mixer and meat pump 12, a Y connection 14 with an extrusion head 26 for discharging meat ropes into a circulating cooking medium, optional transparent tubing 17, sanitary stainless steel tubing 16 with a space saving spiral 18, a steam jacketed kettle 22 for collecting and heating of the circulating cooking medium, a wire mesh conveyor 20 which catches the cooked meat ropes and allows the broth to pass through for collection, and a broth circulating pump 24.

In this embodiment, a combination mixer and meat pump 12 is used to force the meat to the Y-connection 14, through the extrusion head 26, and into optional transparent tubing 17 and the stainless steel tubing 16 in which the hot cooking medium circulates. The cooked meat and circulating broth flow through the tubing 16, the space saving spiral 18, and finally exit the tubing at tubing exit 28. The cooked meat ropes and broth then fall on to the wire mesh conveyor 20 wherein the ropes and broth are separated. The broth may be returned to the heating kettle 22 for recirculation by broth pump 24 to the extrusion head 26, or it may be transported for other processing or storage. The cooked meat ropes may likewise be transported for additional cooking and broth formation, other processing, or storage.

The mixing and extrusion can be provided by a combination mixer and meat pump as in FIG. 1 or they can be performed by separate devices as indicated below. Mixing of the meat source to extract protein to enhance binding prior to extrusion is optional and can be done in any number of mixers common to the industry, including but not limited to bowl mixers, ribbon mixers, or continuous auger type mixers. Several types of food pumps including but not limited to sausage stuffers, positive displacement pumps, and piston type food pumps, in addition to standard extruders are available for continuous or batch operation and are satisfactory to extrude the meat. The "Y" connection 14 is fitted with an extrusion head 26 allowing direct extrusion of meat into the circulating cooking medium. In a preferred embodiment of the invention, the cooking medium is water or recirculated broth. Sanitary tubing 16, sized to the output of the operation, carries the circulating cooking medium and extruded meat. Any tubing capable of being sanitized and capable of withstanding the required cooking temperatures can be used, preferably sanitary stainless steel tubing. Horizontal lengths of tubing 16, preferably in the form of spirals 18, may be used. In a preferred embodiment, an optional transparent tubing 17 is provided just downstream fro the extrusion head. This provides a view port which is useful during start up to ensure proper formation of meat ropes. Transparent tubing 17 can be constructed of any transparent material which can withstand the cooking temperature, such as glass or plexiglass. Additional heat may be applied to the tubing in any number of ways recognized in the art, such as by jacketing the tubing and other external heating methods, or culinary steam may be directly injected into the circulating cooking medium and extruded meat mixture at points strategically placed along the length of the tubing.

Cooked meat and broth exit the tubing at tubing exit 28 and fall onto a filtering apparatus, preferably a wire mesh conveyor 20, which catches the cooked meat pieces and allows the broth to pass through. The wire mesh conveyor 20 catches the cooked meat, transports it to further processing or storage, and allows the broth to pass through where the broth is collected on a pan, tray, or other available liquid collection device, and transported for further processing or storage. A heating kettle 22 or similar device may be used to heat the water or recirculating broth prior to transport to the extrusion head 26. Such kettle 22 is optional and may be used to provide all of the necessary heat to the cooking medium, or a portion of the necessary heat to the cooking medium, or none of the necessary heat. Pump 24 circulates the cooking medium to the Y-connection extrusion assembly 14. Any type of pump suitable for pumping liquids may be used, including but not limited to centrifugal pumps, positive displacement pumps, diaphragm pumps, and progressive cavity pumps.

Figure 2:
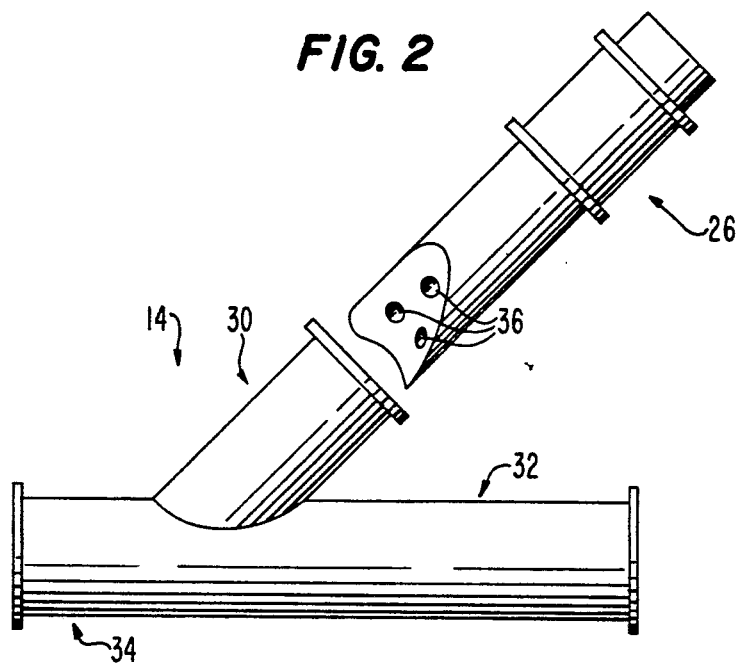
FIG. 2 is a disassembled view of the extrusion head Y-connector combination.
Figure 3:
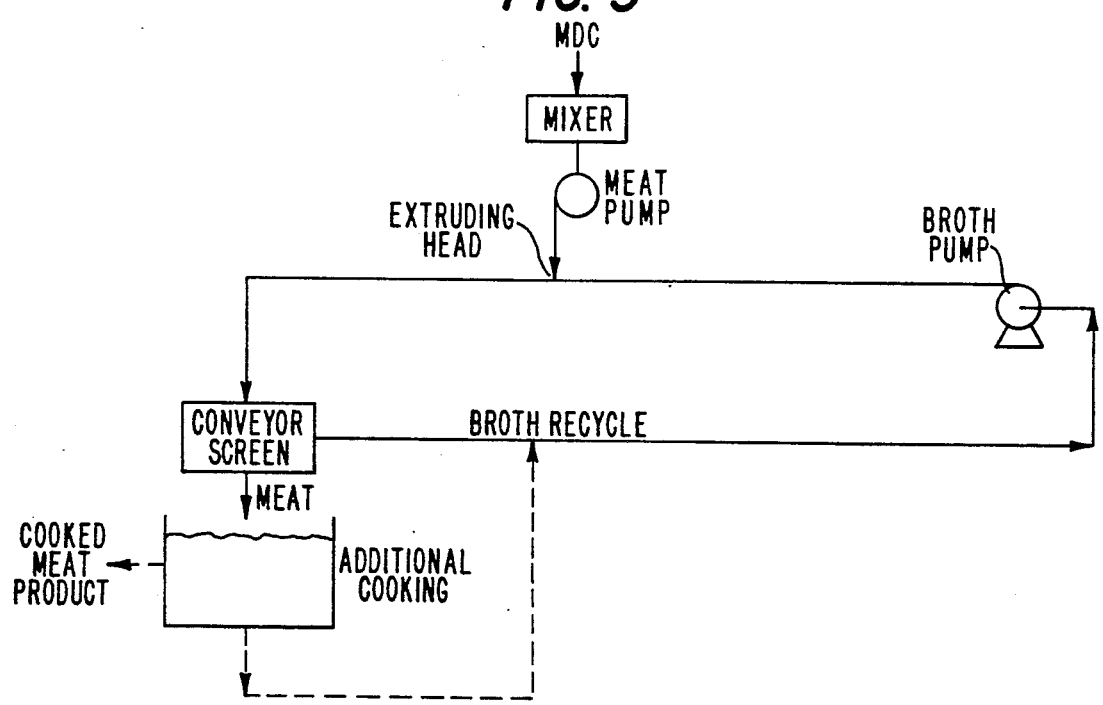
FIG. 3 is a flow sheet showing a typical series of steps in the overall process of the invention.

In FIG. 2, the extrusion head 26 may be made of any appropriate material including but not limited to sanitary stainless steel, ceramic, glass, or a polymeric substance such as Delrin or Teflon, Teflon being the preferred material. The extrusion head 26 has at least one extruding orifice, preferably a plurality of extruding orifices 36, sized to yield the desired rope diameter. The extruding orifices 36 are preferably from about 1/16 inch to about 4 inches in diameter, and most preferably from about 1/16 inch to about ½ inches in diameter. The portion 30 of the Y-connection assembly 14 is designed to receive the extruding head 26, allowing extrusion directly into the circulating hot cooking medium. The portion 32 of the Y-connection assembly 14 brings the circulating hot cooking medium to the extrusion head 26. The extruded meat ropes and hot cooking medium exit the Y-connection assembly 14 through the outlet portion 34 and flow through the tubing 16.

The Y-connection assembly 14 is the preferred mode of connecting the extrusion head 26 with the hot circulating cooking medium, thereby allowing extrusion directly into the hot cooking medium in the direction of flow. However, numerous alternatives are possible and are obvious to those skilled in the art. Possible examples of such alternatives are provided in FIGS. 4A, B, and C.

Figure 4A:
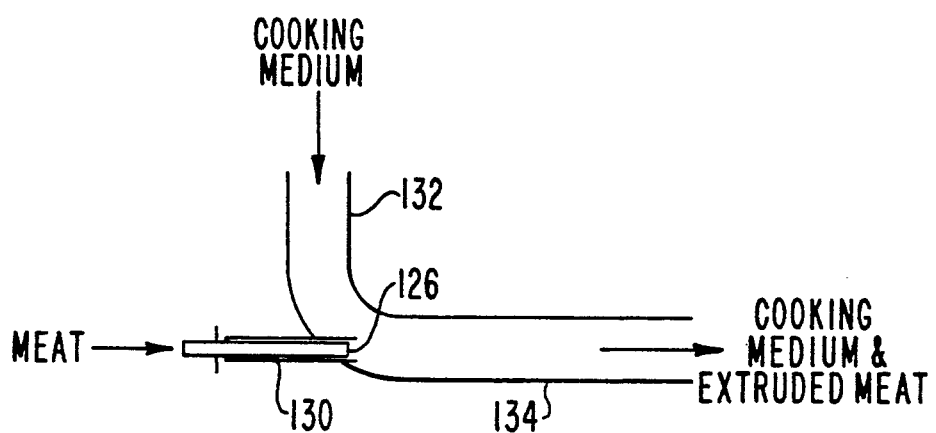
FIGS. 4A, B, and C display examples of possible alternatives to the Y-connection of FIG. 2.
Figure 4B:
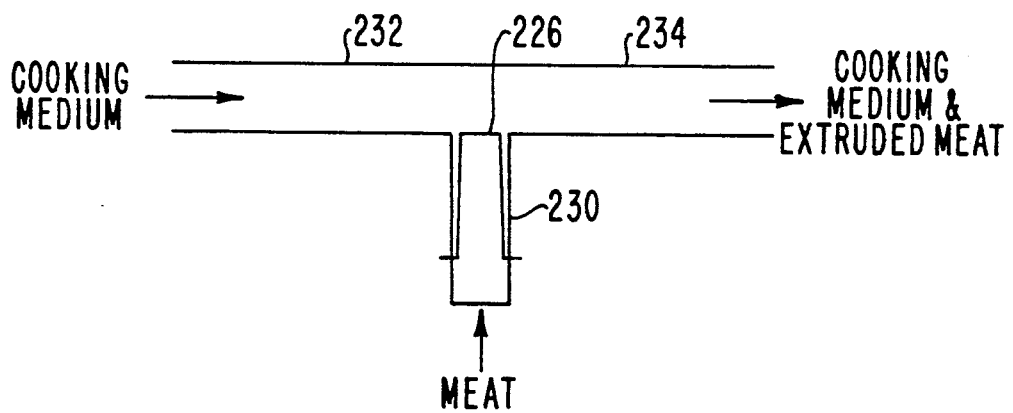
Figure 4C:
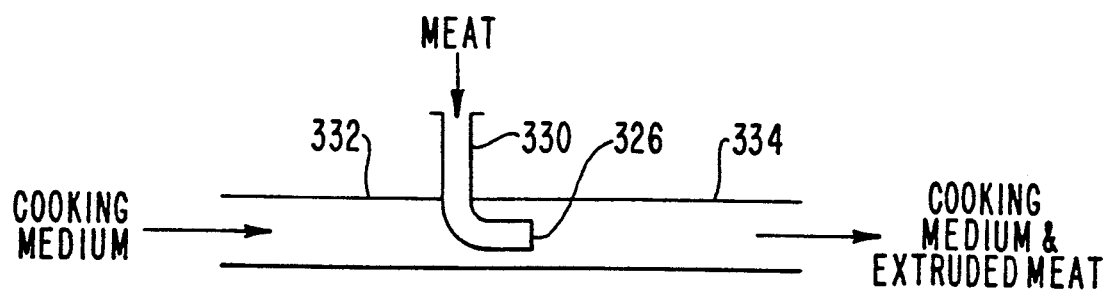

In FIGS. 4A, 4B, and 4C respectively, portions 130, 230, and 330 receive appropriately designed extruding heads (not shown here), allowing extrusion directly into the circulating hot cooking medium. The portions 132, 232, and 332 bring the circulating hot cooking medium to the extrusion head. The extruded meat ropes and hot cooking medium exit through the outlet portions 134, 234, and 334 and flow into the rest of the tubing system.

The following examples are for illustrative purposes only and are not meant to limit the claimed invention in any manner.

EXAMPLE 1

Mechanically Deboned Chicken (MDC) was made of frozen front halves and rear halves of male breeder chickens. After thawing the blocks of frozen raw ingredient, the chicken parts were mixed for about 15 minutes without salt or other additives in a Hobart mixer bowl. The resultant meat mix had a temperature of about 45° F. to about 50° F.

Using the apparatus of FIG. 1, the meat mix was extruded through a ¼" orifice as meat ropes into a 90 foot long two inch diameter flex pipe arranged in spiral form through which flowed hot water (about 175° F. to about 202° F.). Pipe retention times of about 160 to about 120 seconds were used for complete cooking to "doneness" of at least about 160° F. (defined as "fully cooked", Meat and Poultry Inspection Manual, Meat and Poultry Inspection Program, Animal and Plant Health Inspection Service, United States Department of Agriculture, September 1973, Part 18, pg. 151-152). The cooked ropes were completely separated from the broth using a ¼" mesh screen at the top of the kettle. About 282 pounds of broth with about 0.5% solids from about 186 pounds of MDC from front halves, and about 319 pounds of broth with about 0.9% solids from about 176 pounds of MDC from rear halves were produced.

All of the extruded cooked meat was further cooked in an open kettle cooked for about 1.5 hours to produce an additional total of about 4.3 pounds of dissolved broth solids from front halves MDC and 7.4 pounds of dissolved broth solids from rear halves MDC. Also, 112.3 pounds of cooked front halves MDC and 114 pounds of cooked rear halves MDC resulted.

EXAMPLE 2

Using the apparatus of FIG. 1, mechanically Deboned Chicken (MDC) purchased from a local poultry processor was mixed for about 10 minutes with about 0.3% salt and about 0.3% sodium phosphate additives. The meat mix was then extruded, tube cooked, and cooked again in an open kettle. The system was charged with water at about 180° F. to about 185° F. About 180 pounds of meat mix was cooked, producing about 142 pounds of cooked meat and about 5.6 pounds of broth solids (or about 186.4 pounds of broth at about 3% solids). The meat formed long pieces or "ropes" upon extrusion which were readily separable from the broth. Both meat and broth were judged to be of excellent quality.

EXAMPLE 3

Stock, meat, and fat were produced from raw mechanically deboned turkey (MDT) ingredients supplied fresh by a local poultry processor. Raw MDT from (1) breast cages and (2) 50% breast cages and 50% backs at about 57° F. to about 62° F. was used without mixing or added ingredients. The meat was pumped through two ¼" orifices with a Veemag Robot 500 continuous vacuum stuffer into a 100 foot long 1.5 inch diameter stainless steel tubing coil. Cooked "ropes" and pieces were separated on a continuous conveyor with a wire mesh belt with ¼" openings.

Test I using MDT from breast cages resulted in cooked meat rope pieces which varied from about 2 inches to several feet in length, depending on the extrusion rate. Excellent separation of the cooked meat and broth resulted, with little or no small pieces passing through the wire mesh conveyor. The initial tube cook resulted in about 300 pounds of broth at about 1.1% solids from about 184 pounds of raw MDT ingredient. The meat ropes were further cooked about 1.5 hours in an open kettle, raising the solids content to about 2%.

Test II using MDT from backs and cages resulted in less desirable cooked pieces which did not bind well. Consequently, the broth contained a significant amount of fines which additional processing would be required to remove. For this ingredient, mixing, possibly with the addition of salt, would be advised to improve binding.

EXAMPLE 4

For this example, raw mechanically deboned turkey (MDT) from breast cages and skinned necks was used.

Both ingredients were mixed in a Hobart mixer bowl for about 5 to about 10 minutes with about 0.5% salt added. Long meat ropes were extruded, tube cooked, and retained for later use in meatball products. MDT from necks alone was also used in an unmixed form with good pieces and separation resulting.

Some of the above raw ingredient was used with the above cooked meat together with 3/16" ground turkey thigh meat in five turkey meatball formulations. Raw MDT in the meat mix ranged from about 0% to about 75%, cooked MDT in the meat mix ranged from about 12% to about 37%, and ground raw turkey thigh meat in the meat mix ranged from 0 to about 70%. The meat ingredients were mixed with spices in a Hobart kitchen mixer and oven cooked to doneness. Finished meatballs were judged for flavor and texture by a sensory evaluation panel. All five formulations were found to be of very good quality. This example demonstrated one use of the inexpensive tube cooked MDT, and demonstrates how both broth and a useful cooked meat ingredient could be obtained from low cost abundantly available MDT.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. A method for producing broth or stock from raw meat, said method comprising extruding said meat into a continuously circulating hot cooking medium and cooking said meat in said cooking medium to produce said broth or stock and cooked meat.

2. The method of claim 1 wherein said raw meat is extruded through an extruder outlet which is immersed in said cooking medium such that the meat is extruded directly into said cooking medium.

3. The method of claim 1 wherein said raw meat is extruded into a continuous tube system in which said cooking medium circulates to form extruded meat in the form of ropes or pieces and said broth.

4. The method of claim 3 wherein said extruded meat is cooked within said tube system.

5. The method of claim 4 wherein the temperature of said cooking medium is about 160° F. to about 212° F.

6. The method of claim 4 wherein the duration of said cooking step ranges from about 45 seconds to about 2 hours.

7. The method of claim 3, further comprising separating said cooked meat from said broth by exiting said tube system onto a filtering apparatus.

8. The method of claim 7 wherein said filtering apparatus is a wire mesh conveyor.

9. The method of claim 1 wherein said cooking medium is selected from the group consisting of water or recirculated broth.

10. The method of claim 1 wherein said raw meat is extruded into a continuous tube system through an extrusion head which is connected to said tube system with a Y-connection.

11. The method of claim 10 wherein said extrusion head contains at least one orifice ranging from 1/16 to 4 inches in diameter.

12. The method of claim 10 wherein said extrusion head contains at least one orifice ranging from 1/16 to ½ inches in diameter.

13. The method of claim 10 wherein said cooked meat and said broth are separated and captured for further processing or storage.

14. The method of claim 1 wherein said cooked meat and said broth are separated and captured for further processing or storage.

15. The method of claim 14 wherein said broth is transported to a heating kettle.

16. The method of claim 15 wherein said broth is heated and at least partly recirculated through a tube system.

17. The method of claim 3 wherein the temperature of said raw meat upon extrusion is about 25° F. to about 80° F.

18. The method of claim 3 wherein the said raw meat is mixed prior to extrusion to extract muscle proteins to enhance binding.

19. The method of claim 18 wherein the temperature of said raw meat upon mixing is about 28° F. to about 80° F.

20. The method of claim 19, further comprising adding from 0 to about 1% by weight based on the weight of the meat, of an additive selected from the group consisting of salt and sodium phosphate and mixtures thereof during mixing.

21. An apparatus for producing cooked meat and broth or stock from raw meat products, said apparatus comprising:
   (a) an extrusion head; said extrusion head having an input and discharge portions;
   (b) containment means for a cooking medium, said containment means connected to the discharge portion of said extrusion head;
   (c) means for circulating said cooking medium through said containment means,
   (d) means for forcing a source of meat through said extrusion head into said containment means, and
   (e) a filtering device for separating said extruded meat from said cooking medium,
   wherein said containment means provides sufficient residence time of said extruded meat in said cooking medium following the connection of extrusion head to said containment means so as to cook said extruded meat contained therein and to allow said cooking medium to extract soluble protein from said extruded meat.

22. The apparatus of claim 21 wherein said extrusion head is constructed of teflon.

23. The apparatus of claim 21 wherein said extrusion head is constructed of Delrin.

24. The apparatus of claim 21 wherein said extrusion head contains at least one orifice.

25. The apparatus of claim 21 wherein said extrusion head contains at least one orifice having a diameter from about 1/16 inch to about 4 inches.

26. The apparatus of claim 21 wherein said means for circulating the cooking medium is a liquid pump.

27. The apparatus of claim 21 wherein said filtering device is a wire mesh conveyor.

28. The apparatus of claim 21 further comprising a heating kettle for heating said cooking medium.

29. The apparatus of claim 21 wherein said extrusion head is connected to said tubing with a Y-connection.

30. The apparatus of claim 21 wherein said forcing means is a food pump.

31. The apparatus of claim 21 wherein said forcing means is an extruder.

32. The appartus of claim 21 wherein said containment means is tubing.

33. The apparatus of claim 32 wherein said tubing is capable of being sanitized and capable of being heated to an adequate meat cooking temperature.

34. The apparatus of claim 33 wherein said tubing is constructed of sanitary stainless steel.

35. The apparatus of claim 28 wherein said cooking medium is circulated from said kettle to said extrusion head.

36. The apparatus of claim 21 or 28 wherein said tubing is heated by jacketing or injection of culinary steam directly into said tubing.

* * * * *